United States Patent

Shank et al.

[11] Patent Number: 5,619,133
[45] Date of Patent: Apr. 8, 1997

[54] SINGLE COIL POSITION AND MOVEMENT SENSOR HAVING ENHANCED DYNAMIC RANGE

[75] Inventors: David Shank, Big Rapids; Stephen R. W. Cooper, Tustin, both of Mich.

[73] Assignee: Nartron Corporation, Reed City, Mich.

[21] Appl. No.: 468,122

[22] Filed: Jun. 6, 1995

Related U.S. Application Data

[63] Continuation-in-part of Ser. No. 69,127, May 28, 1993, abandoned, which is a continuation of Ser. No. 296,183, Jan. 11, 1989, Pat. No. 5,216,364, and a continuation-in-part of Ser. No. 169,771, Dec. 17, 1993.

[51] Int. Cl.6 .............................. G01B 7/14; G01R 33/00
[52] U.S. Cl. ................ 324/207.24; 324/207.16
[58] Field of Search .................... 324/207.16, 207.17, 324/207.18, 207.19, 207.24, 225, 207.12

[56] References Cited

U.S. PATENT DOCUMENTS

| | | |
|---|---|---|
| 2,911,632 | 11/1959 | Levine et al. . |
| 3,001,183 | 9/1961 | McKenney et al. . |
| 3,020,527 | 2/1962 | MacLaren . |
| 3,030,574 | 4/1962 | Nissenson . |
| 3,181,055 | 4/1965 | Bischof . |
| 3,654,549 | 4/1972 | Maurer . |
| 3,821,652 | 6/1974 | Wiebe et al. . |
| 3,890,607 | 6/1975 | Pelenc et al. . |
| 3,891,918 | 6/1975 | Ellis . |
| 3,982,189 | 9/1976 | Brooks et al. . |
| 3,995,222 | 11/1976 | Mitarai . |
| 4,358,762 | 11/1982 | Wolf et al. . |
| 4,408,159 | 10/1983 | Prox . |
| 4,502,006 | 2/1985 | Goodwin et al. . |
| 4,658,153 | 4/1987 | Brosh et al. . |
| 4,663,589 | 5/1987 | Fiori, Jr. . |
| 4,665,372 | 5/1987 | Schwartz . |
| 4,723,446 | 2/1988 | Saito et al. . |
| 4,742,794 | 5/1988 | Hagstrom . |
| 4,797,614 | 1/1989 | Nelson . |
| 5,027,781 | 7/1991 | Lewis . |
| 5,036,275 | 7/1991 | Munch et al. . |
| 5,150,615 | 9/1992 | Rymut et al. . |
| 5,202,628 | 4/1993 | Locher et al. ............ 324/207.24 |
| 5,210,490 | 5/1993 | Munch et al. . |
| 5,216,364 | 6/1993 | Ko et al. . |

FOREIGN PATENT DOCUMENTS

| | | |
|---|---|---|
| 2914083 | 10/1979 | Germany . |
| 3603950 | 8/1987 | Germany . |
| 0994906 | 2/1983 | U.S.S.R. ............ 324/207.16 |
| 1232931 | 12/1984 | U.S.S.R. . |
| 2021770 | 2/1979 | United Kingdom . |

OTHER PUBLICATIONS

William Brenner, "Magnetostrictive LDTs are precise, built tough," Instrumentation & Communication System Magazine, Sep. 1989, pp. 45–47.

Mueller et al., "The New Navistar T 444E Direct–Injection Turbocharged Diesel Engine," SAE Tech Paper Series #930269, pp. 1–19, Mar. 1–5, 1993.

(List continued on next page.)

Primary Examiner—Walter E. Snow
Attorney, Agent, or Firm—Watts, Hoffmann, Fisher & Heinke Co., L.P.A.

[57] ABSTRACT

A control circuit electrically coupled to the conductive coil of the elongated probe includes an energization circuit for coupling an alternating current signal to the coil. A monitoring circuit monitors a signal from the coil as the alternating current signal is applied to the coil that changes with a degree of overlap between the coupling member and the elongated probe and for providing an output signal related to the relative positions of two moveable members. A feedback control circuit adjusts the alternating current signal coupled to the coil to a control level based on the monitored signal from the monitoring circuit. Use of the feedback control enhances a dynamic range of the output signal from the monitoring circuit.

12 Claims, 8 Drawing Sheets

OTHER PUBLICATIONS

Lynch, Terrence, "Non–Contacting Sensor Handles Demands of Road Sensing Suspension," reprinted from Design News, Mar. 1993.

Stetanides, E.J., "Inductive Sensors Improve Automotive Position Sensing", Design News, Oct. 3, 1988, pp. 256–257.

Wells, Roger F., "Non–Contacting Sensors: an update" Automotive Engineering vol. 96, No. 11, pp. 39–45, Nov. 1988.

Undated product brochure for Nartron's Linear Position Valve Sensor (Part No. 4000A02A).

Nartron's Press Release dated Mar. 1, 1983 for Nartron's EGR Valve Position Sensor.

Undated product brochure for Nartron's Non–Contact Linear Position Sensor.

Undated product brochure for Nartron's Position & Velocity Sensor (Part No. 411 4119).

Undated product brochure for Nartron's Position & Velocity Suspension Sensor (Part No. 4113110).

2–page product brochure for Nartron's Spool Valve Sensor & Control System (Part No. 3104088E–1) drawing dated Jul. 12, 1988.

2–page product brochure for Nartron's Spool Valve Sensor System (Part No. 4099068E–1) drawing dated Jul. 12, 1988.

SINGLE COIL POSITION AND MOVEMENT SENSOR HAVING ENHANCED DYNAMIC RANGE

CROSS REFERENCE TO RELATED PATENTS

The present patent application is a continuation-in-part of patent application Ser. No. 08/069,127, filed May 28, 1993, entitled "Linear Position Sensor", now abandoned, which is a continuation of U.S. application Ser. No. 07/296,183, filed Jan. 11, 1989, entitled "Linear Position Sensor," to Munch et al which is now U.S. Pat. No. 5,216,364 and is also a continuation-in-part of U.S. patent application Ser. No. 08/169,771 which was filed Dec. 17, 1993, pending.

FIELD OF THE INVENTION

The present invention concerns a sensor that provides a signal that varies with motion (translation or rotation) according to a function such as a voltage transfer function. More specifically, the invention relates to a linear position sensor and a control for such linear position sensor and a control for such linear position sensor.

BACKGROUND ART

Automotive ride control systems provide active suspension response to road conditions by reacting to forces tending to compress the suspension members. In order to accomplish this, it is necessary to provide a real time measurement of the position of various portions of the suspension system, such as each wheel assembly, with respect to the vehicle frame. Those relative position variables are provided as an input to a ride control computer, which dynamically responds by adjusting the fluid pressure in the respective shock absorbers.

Both mechanical and electrical sensors have been used to measure the positions of the various portions of the suspension system. Among the advantages of electronic sensors are that they are easier to calibrate, less prone to wear and more compact, so that they are less exposed to deformation by gravel or ice dislodged from the road. Among the types of electronic sensors which find use in an automotive environment are variable resistance, variable reluctance, differential transformer and Hall Effect sensors.

One preferred location for an electronic position sensor is in or near the shock absorber, where the relative movement of each wheel may be monitored by the relative movement of the telescoping shock absorber. The environment inside a shock absorber is extremely hostile, subjecting an internally mounted sensor to pressures of up to 6500 psi and temperatures of up to 135° C. Even when located outside the shock absorber, the sensor will be exposed to a severe environment requiring that the sensor be resistant to degradation by various automotive fluids and extremely stable under wide swings in ambient temperature. Additionally, to be successful in the automotive field, the sensor must be inexpensive to produce and reliable in performance, and must not be subject to significant wear over extended periods of time.

One drawback to the use of electronic sensors is that the electrical properties of the materials from which the sensors are constructed change with temperature. One prior art approach to temperature correction is to employ a temperature sensor coupled to a microprocessor capable of performing a temperature correction on the raw output of the sensor. While a sensor system incorporating an added temperature sensor has the advantage of increased accuracy, it has the disadvantage of increased complexity and expense to design and manufacture. Due to subtle differences between electronic sensors, it may be necessary to calibrate the temperature correction for each pair of position and temperature sensors separately, thereby significantly increasing the labor costs per unit.

U.S. Pat. No. 3,891,918 to Ellis concerns a measuring system having a transducer that produces a time varying function used to provide a direct digital measurement of a displacement.

DISCLOSURE OF THE INVENTION

The present invention concerns a sensor and circuitry for activating or energizing the sensor with a time varying signal. An output from the sensor varies in proportion to a sensed property. A circuit conditions the sensor input signal to derive a control signal from the circuit that utilizes positive feedback so that the dynamic response of the sensor is increased.

In accordance with one embodiment of the present invention, sensing apparatus monitors relative movement between two relatively moveable members. An elongated probe moves with a first of the two relatively moveable members and has a radially-wound electrically conductive coil encircling a supporting core along a length of said core. A conductive coupling member moves with a second of the two moveable members and overlaps at least a portion of the elongated probe and translates along the length of the core as a relative separation between the two relatively moveable members changes. One use of the invention is to monitor motor vehicle ride for use with an active suspension.

A control circuit electrically coupled to the conductive coil of the elongated probe includes an energization circuit for coupling an alternating current signal to the coil. A monitoring circuit monitors a signal from the coil as the alternating current signal is applied to the coil that changes with a degree of overlap between the coupling member and the elongated probe and for providing an output signal related to the relative positions of two moveable members.

A feedback control circuit adjusts the alternating current signal coupled to the coil to a control level based on the monitored signal from the monitoring circuit. Use of the feedback control enhances a dynamic range of the output signal from the monitoring circuit.

In accordance with a preferred embodiment of the invention the energization circuit has an automatic gain control circuit for controlling the alternating current signal applied to the coil. The automatic gain control uses a return signal from the coil and a reference signal that is applied to the energization circuit to determine the energization applied to the coil. The reference signal is from a signal source and in this preferred embodiment the feedback control circuitry comprises a resistance network coupled between the signal source and the energization circuitry.

Use of the feedback circuit enhances the dynamic response of the sensor apparatus. This means that the range of responses for output signals is larger for a given extent of movement for the relatively moveable members. These and other objects advantages and features of the invention will be better understood from the description of the preferred embodiment of the invention which is described in conjunction with the accompanying drawings.

DESCRIPTION OF THE PREFERRED EMBODIMENT

Figure 1:
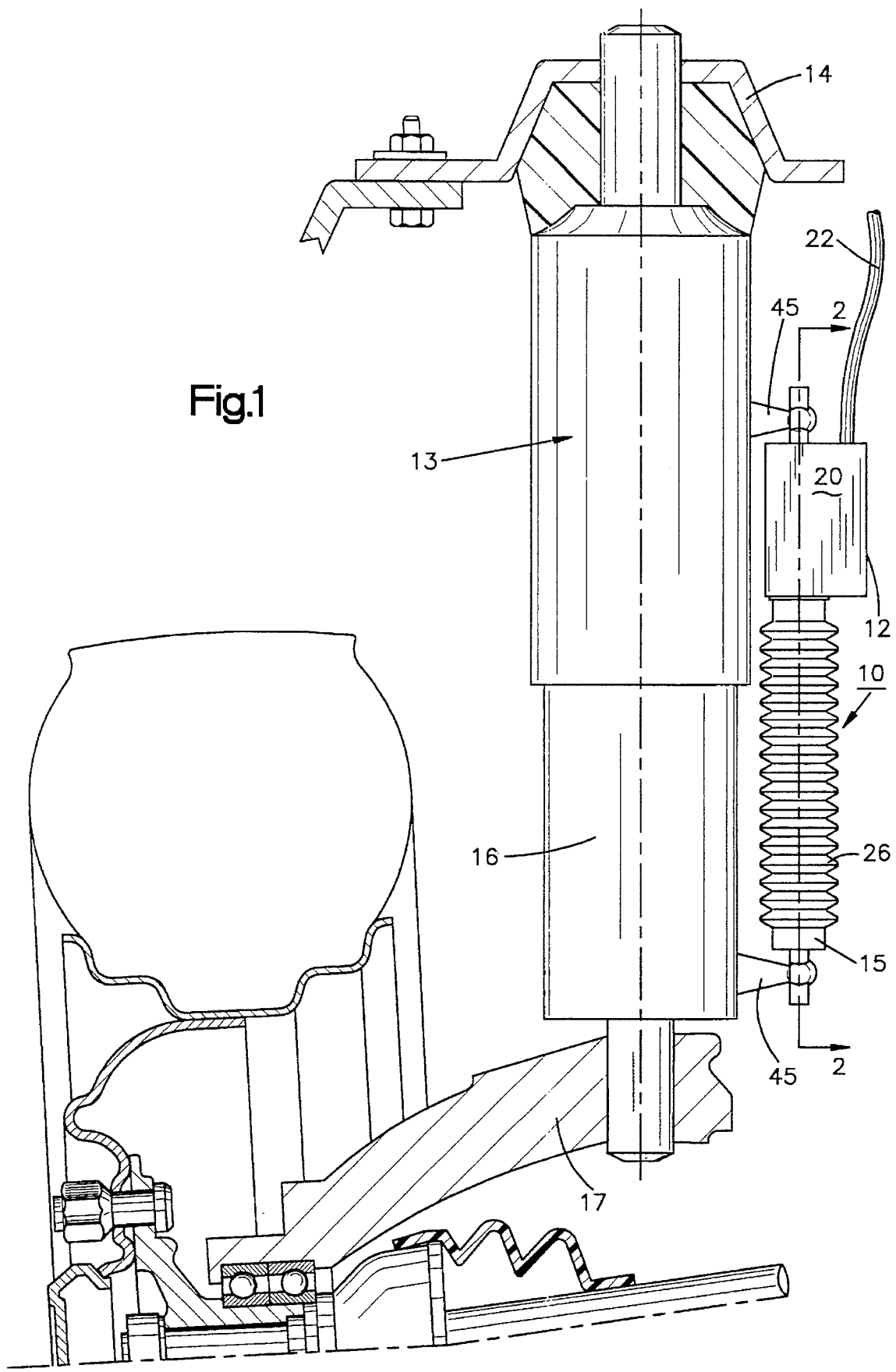
FIG. 1 is a side view of a non-contact position sensor coupled to a vehicle shock absorber.

Referring now to the drawings, and the illustrative embodiments depicted therein, a non-contact position sensor 10 includes a base portion 12 attached to one portion of a vehicle, such as the portion of a shock absorber 13 attached to the vehicle chassis 14, and a tracking portion 15 which is attached to a portion of the vehicle whose position it is desired to sense, such as the portion 16 of the shock absorber attached to a wheel support assembly 17 (FIG. 1). The base and tracking portions 12, 15 are relatively longitudinally moveable with respect to each other and are external to the shock absorber 13.

The position sensor 10 further includes a housing 20 that supports circuitry for generating position indicating signals and transmitting those signals via a cable 22 to a vehicle ride control computer. In a preferred design an electrical connector 23 (FIG. 2) attached to the cable 22 is adapted to engage a mating connector (not shown) for connection to a ride control computer and provides input and output interconnection for the position sensor 10.

Figure 2:
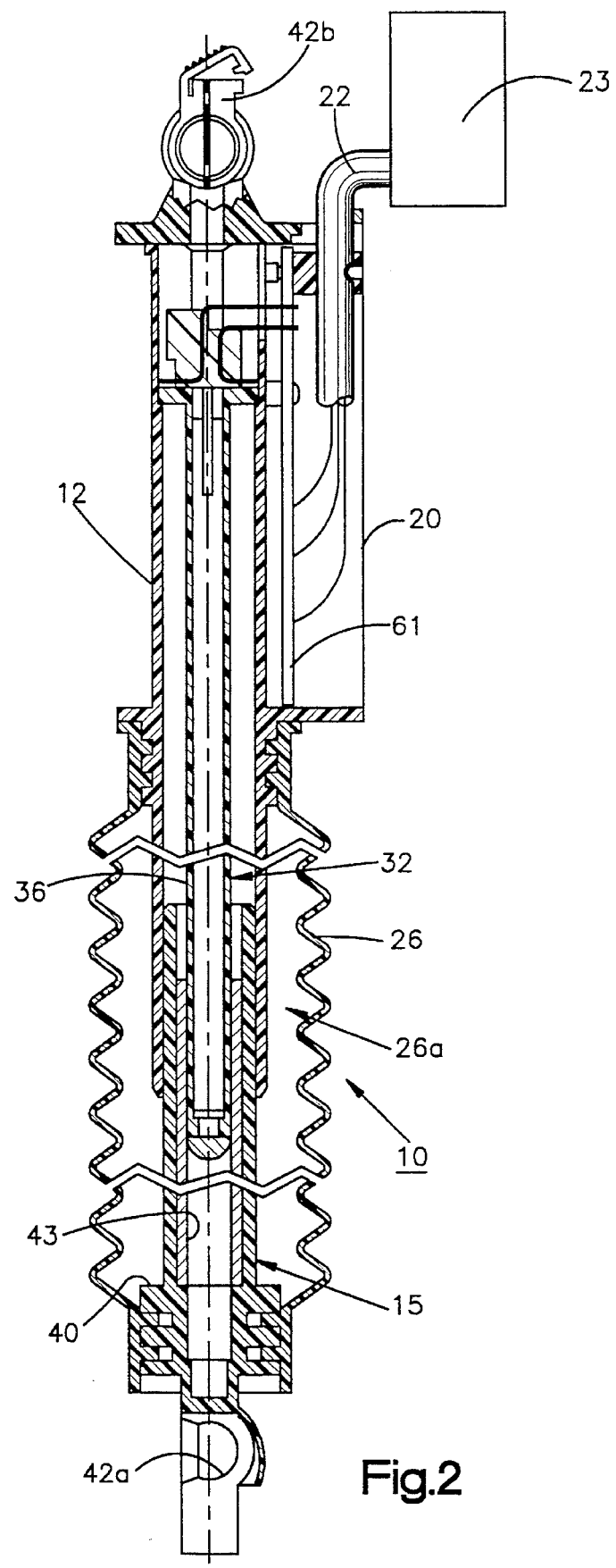
FIG. 2 is an enlarged sectional view of the position sensor as seen from the plane defined by the line 2—2 in FIG. 1.

A flexible cylindrical bellows 26 is coupled at one end to the base portion and at an opposite end to the tracking portion of the sensor 10 and defines an internal chamber 26a (FIG. 2). A winding assembly 32 extends from the base portion 12 into a region surrounded by the bellows 26. The winding assembly 32 includes a proximal end portion 34 fixed to the sensor base portion 12 and a distal sensing portion positioned within the bellows 26.

The tracking portion 15 includes a support 40 for a transformer coupling member that includes an elongated tubular conductor 43. The tubular conductor 43 has an inner diameter selected to freely slide over an outer diameter of the winding assembly 32. The support 40 includes a fitting 42a for attachment of the tracking portion 15 of the sensor to a mounting stud 45 of the shock absorber. A similarly constructed fitting 42b at the base portion 12 of the sensor 10 allows the sensor 10 to be attached to a second mounting stud 45 attached to the shock absorber.

The winding assembly 32 includes a primary winding 44 and a secondary winding 46 that are mutually suspended in a material 48 within a plastic casing 49. This material 48 acts to damp shock and vibration. The primary and secondary windings 44, 46 are aligned side-by-side, for substantially their entire length and are generally mutually parallel and spaced apart. The primary winding 44 includes an elongated cylindrical core 50 and a coil 52 defined by a single magnet wire spirally wound around the core 50 over substantially the entire length of the core. The secondary winding 46 includes an elongated cylindrical core 54 having a coil 56 defined by a single magnet wire spirally wound around core 54 over substantially its entire length.

The proximal end 34 of the winding assembly 32 includes a plastic carrier 51 (FIG. 7) that carries metal terminals 53a–53d for routing energization signals to the primary winding 44 and output signals from the secondary winding 46. The carrier 51 is constructed from plastic (preferably 30% glass reinforced polyester) and is molded to form right and left carrier halves. Each half defines an opening 55 in which the cylindrical cores 50, 54 are supported. The wire coils 52, 56 are then wound around the cores 50, 54 and attached to their respective terminals before the insulator such as a MYLAR sleeve is slipped over the coils. The two halves of the carrier 51 are then attached together and the cores 50, 54 are suspended in the suspension material 48. To suspend the windings 44, 46 the cylindrical sheath 49 is filled with the suspension material by pouring the material into an inner cavity of the sheath 49. An end cap or plug 53 is pressed into a distal end of the sheath 49. The completed winding assembly 32 is then pushed into the base portion 12 of the sensor until the carrier 51 seats within a cavity in the base portion 12. A plastic cover 55 that includes the fitting 42b is then connected to the base portion 12 to fix the winding assembly 32 in place.

The bellows 26 engages similarly configured circular slots or grooves 57, 59 defined by the base and tracking portions 12, 15 respectively and inhibits dirt and the like from entering the sliding interface between the support 40 and the base portion 12. During installation the tracking portion 15 is attached to the shock absorber via the fitting 42a and stud connection. The bellows 26 is attached to the tracking portion 15 and the base portion so the winding assembly 32 fits within the conductor 43. The base portion 12 is then attached to the stud 45 via the fitting 42b and the bellows attached to the base portion by pushing the bellows over the base portion 12 until ridges of the bellows seat in the grooves 57.

When the sensor 10 is installed the tubular conductor 43 (3003 aluminum alloy, half hardened) surrounds a varying length of the coextensive, spaced, parallel primary and secondary windings 44, 46 and provides a transformer coupling adjustment member for the windings, which are configured as a transformer. In the embodiment illustrated in FIGS. 1–4, the tubular conductor 43 is a transformer coupling enhancing member which increases the transformer coupling between the primary and secondary windings as the primary and secondary windings and tubular conductor 43 become more telescopingly coextensive, as a result of movement of the vehicle wheel assembly 17 closer to the vehicle frame 14.

In the illustrated embodiment, the tubular conductor 43 is a nonferrous metal, such as aluminum, which enhances transformer coupling between the primary and secondary windings 44, 46 through a looping current that is developed in the tubular conductor 43 as a result of excitation of the primary winding 44.

Figure 5:
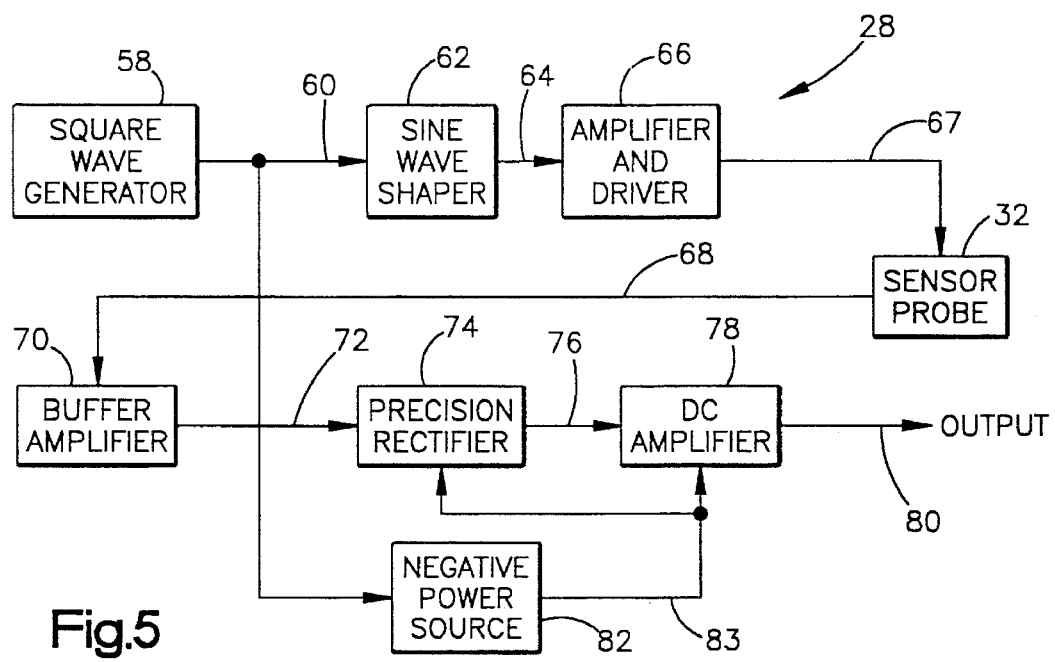
FIG. 5 is an electrical circuit diagram in block form of an electrical control circuit for activating the linear position sensor of FIGS. 1–4.

With reference to FIG. 5, organization of a discrete component control circuit 28 mounted to a printed circuit board supported within the housing 20 will be described. A square wave generator 58 produces a square wave signal on its output line 60. The square wave signal, which operates at 12.8 KHz in the illustrated embodiment, is provided as an input to a sine wave shaper circuit 62 which converts the square wave signal to a low-harmonic distortion sine wave signal having the same frequency which is provided on its output 64. The sine wave signal is amplified by an amplifier and driver circuit 66 and provided at an output 67 to the primary winding 44 of the winding assembly 32. The sine wave signal provided to the primary winding is coupled to the secondary winding in proportion to the relative longitudinal overlap of the winding assembly 32 and the coupling member 42. The signal developed across the secondary winding is provided on an output 68 to a buffer amplifier 70, which provides a high input impedance for and amplifies the relatively small signal developed across the secondary winding. Buffer amplifier 70 additionally includes means for eliminating induced high frequency noise and any DC offset. The output 72 of the buffer amplifier is provided to a precision rectifier 74 which produces a DC analog voltage on its output 76, proportional to the average AC voltage developed across the secondary winding. The DC analog voltage is amplified by a DC amplifier 78 and provided by an output 80 as an input to a ride control computer of the vehicle (not shown).

The output 60 of the square wave generator 58 is additionally provided as an input 81 to a negative power source 82 which produces a voltage on its output 83 which is negative with respect to the vehicle chassis ground and is provided as an additional supply voltage to the precision rectifier 74 and the DC amplifier 78. The purpose of supplying these portions of the control module with a negative voltage, which is normally not available in a vehicle electrical system, in addition to the conventional positive supply voltage, is to improve the linearity of the output signal, especially at low signal levels, while allowing the DC offset of the sensor output to be adjusted to a desired level, which may be zero or even a negative voltage. Additionally, by supplying a voltage to the precision rectifier and the DC amplifier that is negative with respect to chassis ground, means are provided for detecting certain internal failures of these circuit portions by monitoring the polarity of the voltage on the output 80. If the polarity of the output becomes more negative than a predetermined level, an indication is provided to the ride control computer that the position sensor is malfunctioning.

A detailed description of this discrete component embodiment of the electrical control system is contained in U.S. Pat. No. 5,036,275 to Munch et al. The contents of this patent are incorporated by reference into the present application.

Figure 3:
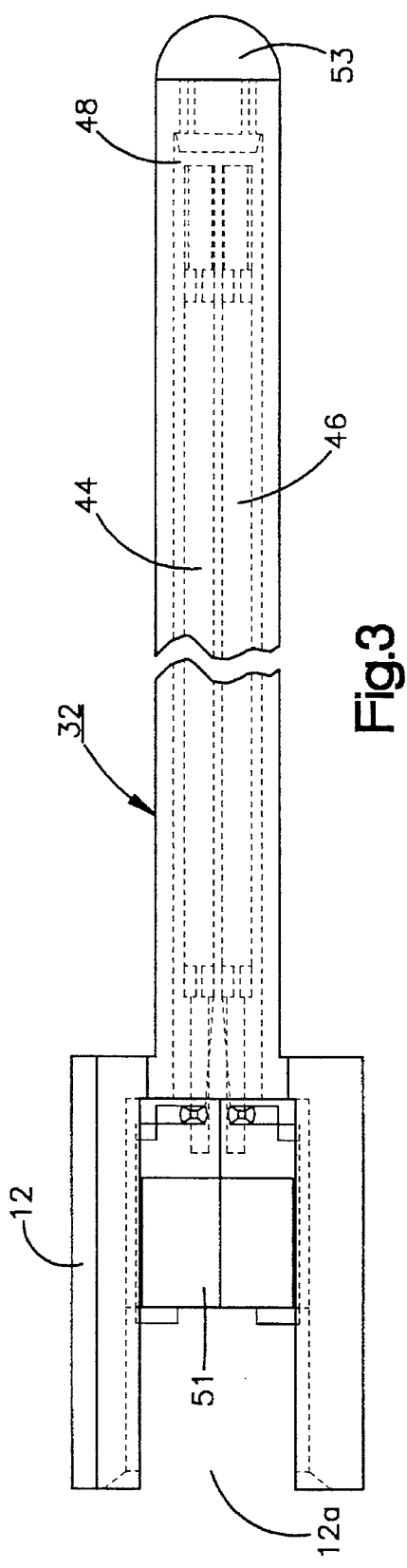
FIG. 3 is a plan view of a winding assembly that forms a part of the position sensor.
Figure 4:
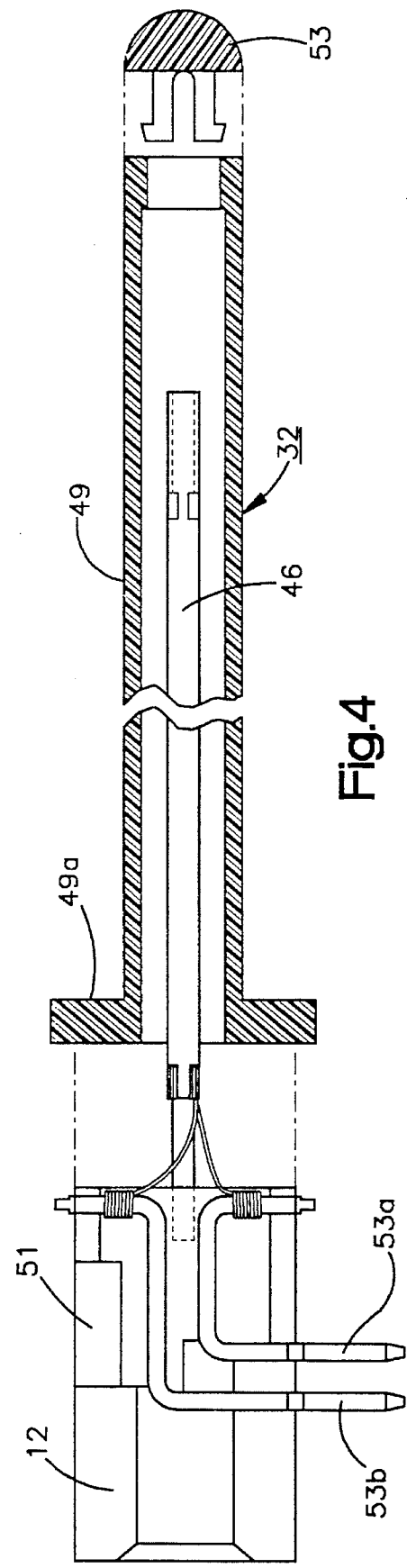
FIG. 4 is a partially sectioned, exploded side view of the winding assembly.

During operation of the FIG. 3 embodiment of the invention, a square wave of stable frequency and amplitude is produced by square wave generator 58 on line 60, which includes a low frequency component and harmonically-related higher frequency components. A scaled version of this square wave is converted to a low-distortion sine wave by the active-load, high frequency shunt action of sine wave shaper 62. Sine wave shaper 62 provides a low-impedance shunt for the higher frequency components and a high-impedance load to the low frequency signal component of the square wave, as well as serves to refine the shape of the resulting signal. Therefore, a low distortion, stable amplitude sine wave is produced. This sine wave signal is amplified by amplifier and driver 66 and is provided to primary winding 44.

The excitation of primary winding 44 induces a spirally looping current in tubular conductor 43. In turn, the looping current in the tubular conductor 43 causes a voltage to be induced in the secondary winding 46 that is proportional to the length of the winding assembly distal portion that is telescoped within the tubular conductor 43. Thus, the tubular conductor 43 provides the transformer coupling between the primary and secondary windings. The voltage developed across secondary winding 46 is amplified by buffer amplifier 70 and rectified to a DC level, equal to the average value of the AC signal, by precision rectifier 74. The output of precision rectifier 74 is amplified and further filtered by the amplifier 78.

Figure 6:
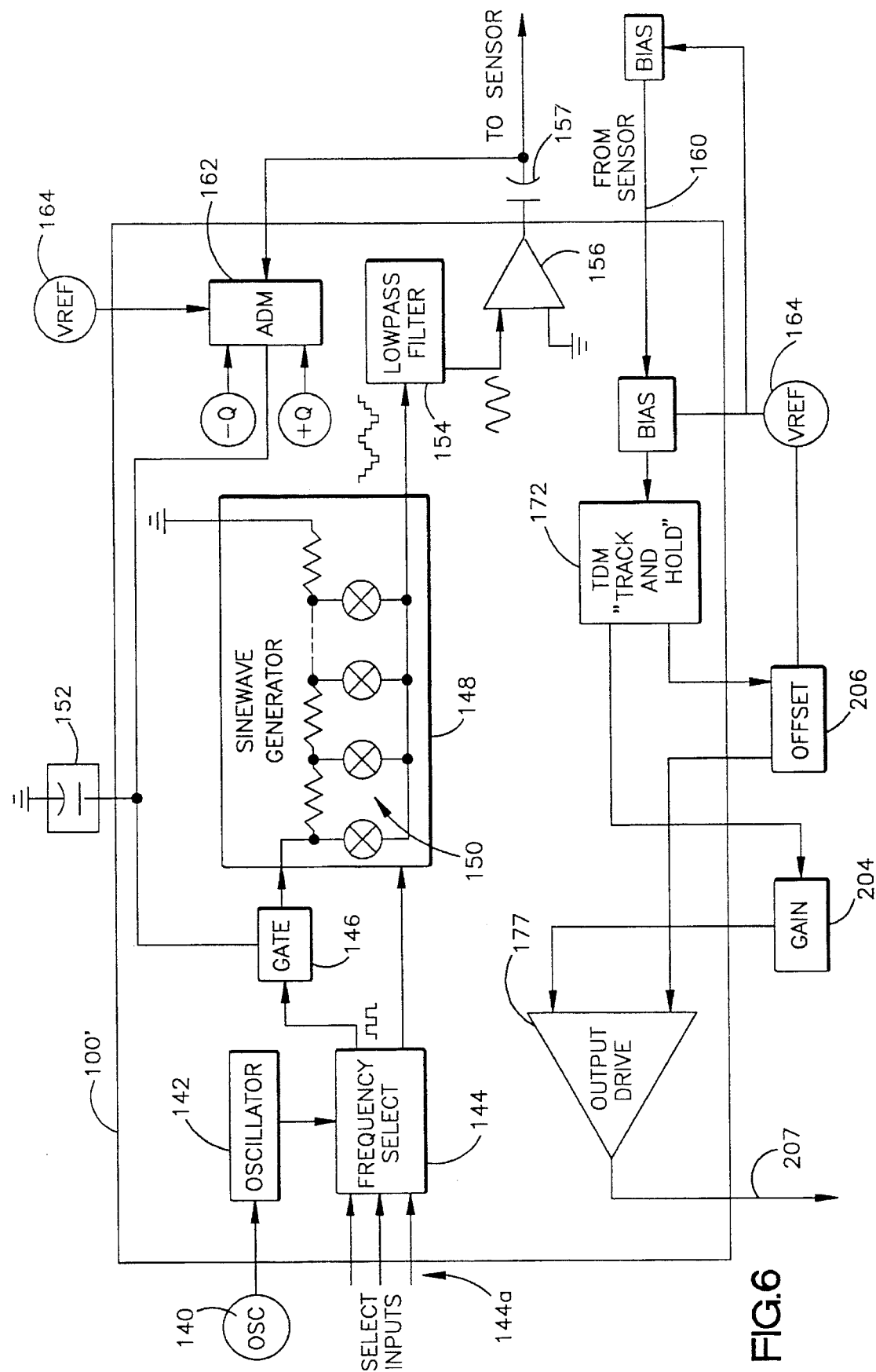
FIG. 6 is a block diagram of an integrated circuit control for activating a position sensor.

FIG. 6 illustrates an integrated circuit control 100 for activating the primary coil of the transformer and responding to return signals from the secondary windings. An oscillator circuit 140 feeds a periodic waveform to an oscillator 142 within the integrated circuit 100' to provide a clock signal. The clock signal is passed to a frequency select stage 144 which generates a second clock signal based on frequency select inputs 144a. A divide-down counter controlled by the frequency select inputs 144a outputs a uni-polar square wave having a frequency that is a fraction of the output frequency of the oscillator 142.

A gate 146 is controlled by the second clock signal and gates a sinewave generator 148 to produce a uni-polar (DC offset) approximation of a sinewave at the selected frequency. The sinewave generator 148 uses the clock signal to consecutively gate steps on a voltage divider resistor ladder 150. The voltages at the steps on the ladder 150 are set to enable signal generation at the desired frequency, i.e., a sinewave approximation at the selected frequency. The sinewave approximation is actually a stepped curve having thirty-two steps per period.

The amplitude of the sinewave approximation is controlled by a voltage which is maintained on an external capacitor 152. This voltage controls the voltage that is applied across the voltage divider resistor ladder 150.

A low-pass filter 154 with all its components located on the integrated circuit 100' removes higher frequency harmonics generated by switching through the steps of the voltage ladder 150. The low-pass filter 154 smoothes the stepped curve into a sinewave.

A linear amplifier 156 follows the low-pass filter 154 and uses an external capacitor 157 to capacitively couple the uni-polar sinewave signal to a ground referenced sensor 10. This results in a bi-polar sinewave drive without resorting to a bi-polar supply to the IC. Therefore, the sinewave now has a positive and negative amplitude whereas, when the curve was a step sinewave approximation, there was no negative amplitude.

The primary drive amplitude is monitored by an automatic gain control input "AGC" 162a from the sensor 10 into an adaptive delta modulation (ADM) circuit 162. Every 32nd clock pulse, the circuit 162 is enabled to compare the voltage applied to the sensor 10 with voltage on an external reference voltage source 164. If, over a complete cycle, the sensor drive voltage exceeds the reference voltage, a fixed amount of charge is removed from the external capacitor 152 by the circuit 162, thereby decreasing the amount of voltage supplied to the voltage ladder 150. When over a complete cycle, the sensor drive voltage fails to come above the reference voltage, a fixed amount of charge is pumped into the external capacitor 152 by the circuit 162, thereby increasing the amount of voltage supplied to the sinewave generator ladder 150. If the consecutive charge cycles fail to bring the sensor drive voltage above the reference voltage, the charge increment is increased to a larger value and maintained until the sensor drive voltage exceeds the reference voltage. When the reference voltage is exceeded, the charge increment drops back to the initial quantity. This procedure allows the circuit 100' to rapidly build up charge on the external capacitor 152 upon power-up of the circuit and then follow the reference voltage thereafter by adding or subtracting a small fixed amount of charge.

The return signal 160 from a sensor is given a DC bias voltage of approximately 0.5 volts from an external voltage source 164.

The track and hold circuit 172 outputs a voltage proportional to the peak voltage of the incoming waveform. This voltage is updated every cycle and is held constant between updates. The result is a stepped approximation of the desired demodulated signal. This is a form of "under sampling" which is well discussed in the literature.

Single Coil Embodiment

Figure 7A:
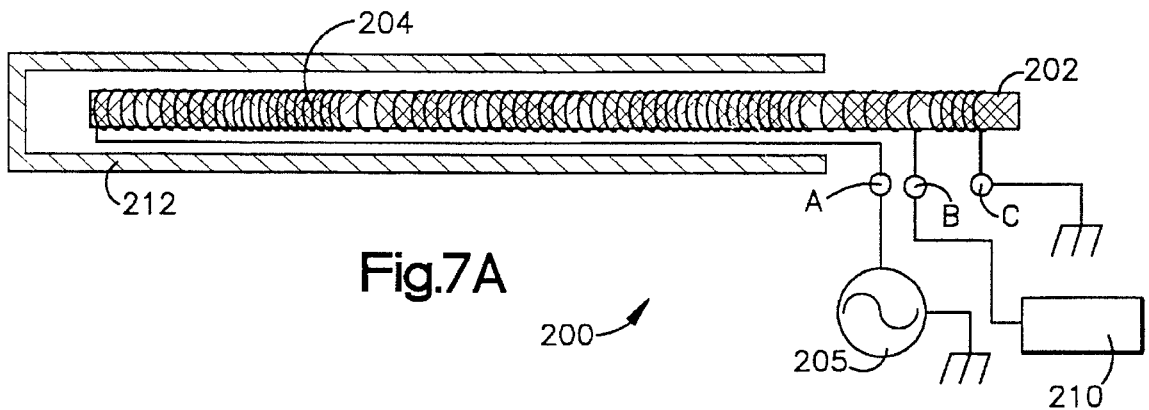
FIGS. 7A and 7B are alternate schematic depictions of single winding coil alternate position sensors.

An alternate single coil embodiment 200 of the invention is illustrated in FIG. 7A. A magnetically permeable core 202 supports an electrically conductive coil 204. The coil has leads A,C with an electrically conductive tap at a lead B which is located at a turn between the leads A,C along the extent of the coil. A time varying drive voltage that is preferably a sinusoid, is applied by a source 205 between the two leads A,C. A signal voltage is then taken from the lead B and is processed by a detector 210. The detector can be an amplitude, phase or frequency detector based on the nature and frequency of the source producing drive voltage and the impedance of coil.

The FIG. 7A embodiment has an inherent temperature stability advantage in that temperature effects in the core will have a similar effect on both the driven coil segment between end points A,C and the measured segment between the two points B,C. The signal read at the point B in turn varies with the position over the coil of a concentric (to the coil) electrically conductive tube 212. The tube 212 is magnetically linked by a portion of the magnetic flux generated by the coil when driven by the source 205.

The time variation of this flux generates circumferential eddy currents in tube which will in turn generate a time varying flux in opposition to the flux produced by the coil (according to Maxwell's well known laws). This counter flux appears as a net loss in inductive reactance in the portion of coil that is overlaid by the tube. If the energizing voltage source 205 operates in a constant voltage mode, then progressive overlapping movement of tube over coil will result in an increase in voltage at point B. If the frequency or phase of the signal varies with the inductance of the coil as in the case where all or part of the inductance in an LC oscillator is provided by the coil, then motion of tube will result in a change in frequency or phase measured at the point B. In this manner (amplitude, frequency or phase) the motion of a member 212 attached to the tube can be electrically monitored.

Figure 7B:
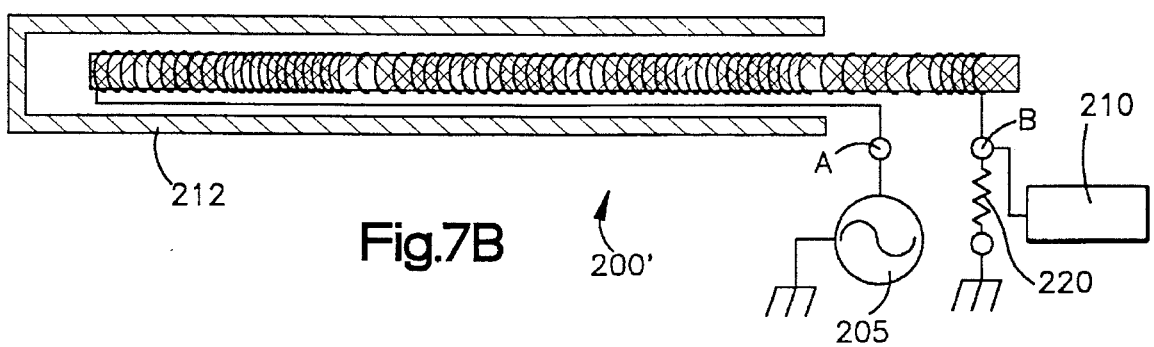

In the single coil embodiment 200' of FIG. 7B, the role of the coil segment between points B and C of FIG. 7A is replaced by a resistor 220. This embodiment functions in the same way as that of FIG. 7A except that the impedance of the resistor can be expected to behave differentially over temperature than would a coil on a magnetically permeable core. An advantage arises in that it can be less costly to manufacture with a series resistor 220 than with a tap B within a coil.

Figure 8:
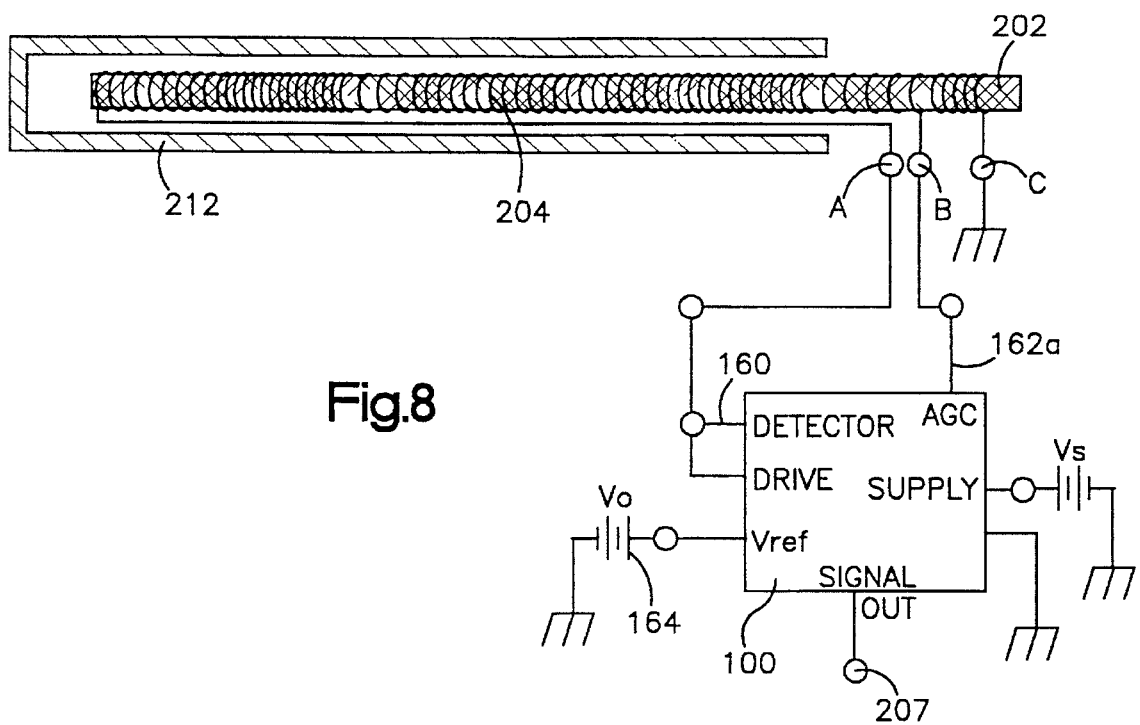
FIG. 8 is a schematic depiction of the integrated circuit shown in FIG. 6 coupled to the single coil position sensor of FIG. 7A.

A single coil embodiment is shown in FIG. 8 coupled to the integrated circuit 100. The coil has leads A,C and is wound on a magnetically permeable core. An electrically conductive tap at a location along the coil is brought out at lead B. An electrically conductive tube is sized and positioned to slide over the coil.

The integrated circuit driver/detector circuit is more fully described in U.S. Pat. No. 5,369,375. The disclosure of this patent is incorporated herein by reference. In such a circuit 100, the voltage amplitude of the sinusoidal "Drive" output will be increased or decreased to make the voltage amplitude of the sinusoid at the "AGC" input 162a a constant proportion of "Vo" the DC voltage applied to a Vref input. The "Signal Out" output 207 of the circuit 100 will generate a DC voltage at a constant proportion to the voltage amplitude of the sinusoid input to the "Detector" input 160. The inputs to the circuit ("AGC", "Detector" and "Vref") are configured to have high impedance (>50 k Ohms).

As described in the first embodiment, the tube 212 will be coupled to any time varying magnetic flux produced by the coil. This coupling will in turn induce eddy currents in the tube which will produce a time varying flux that opposes that produced by the coil. This is seen as a net decrease in inductive reactance in the coil over what would be seen if the tube were not present. As a result, the inductive reactance of the coil will increase as the tube is drawn off of the coil and will decrease as it is pushed over the coil. The circuit 100 in turn will produce sufficient current from the "Drive" output from the amplifier 156 (FIG. 6) to maintain a constant voltage amplitude sinusoid at the "AGC" input 162a. For instance, if the electrically conductive tube is pushed over a greater portion of the coil, the inductive reactance of the coil will decrease and the amplitude of the sinusoid applied to "A" will be decreased by the circuit to keep a constant amplitude sinusoidal voltage at "B" (providing no portion of the tube 212 covers the region of the coil between points "B" and "C"). This will result in a smaller amplitude sinusoidal voltage at the "Detector" input 160 and a proportionally smaller DC voltage from the "Signal Out" output 207 of the circuit.

Conversely, as the tube is drawn off of the coil, the coil's inductive reactance will increase and the amplitude of the sinusoidal voltage at "A" will be increased by the circuit to maintain a constant amplitude sinusoidal voltage at "B". This will result in a larger amplitude sinusoidal voltage seen at the "Detector" of the circuit and a proportionally larger DC voltage produced at the "Signal Out" output of the circuit 100.

Positive Feedback Embodiment

Figure 9:
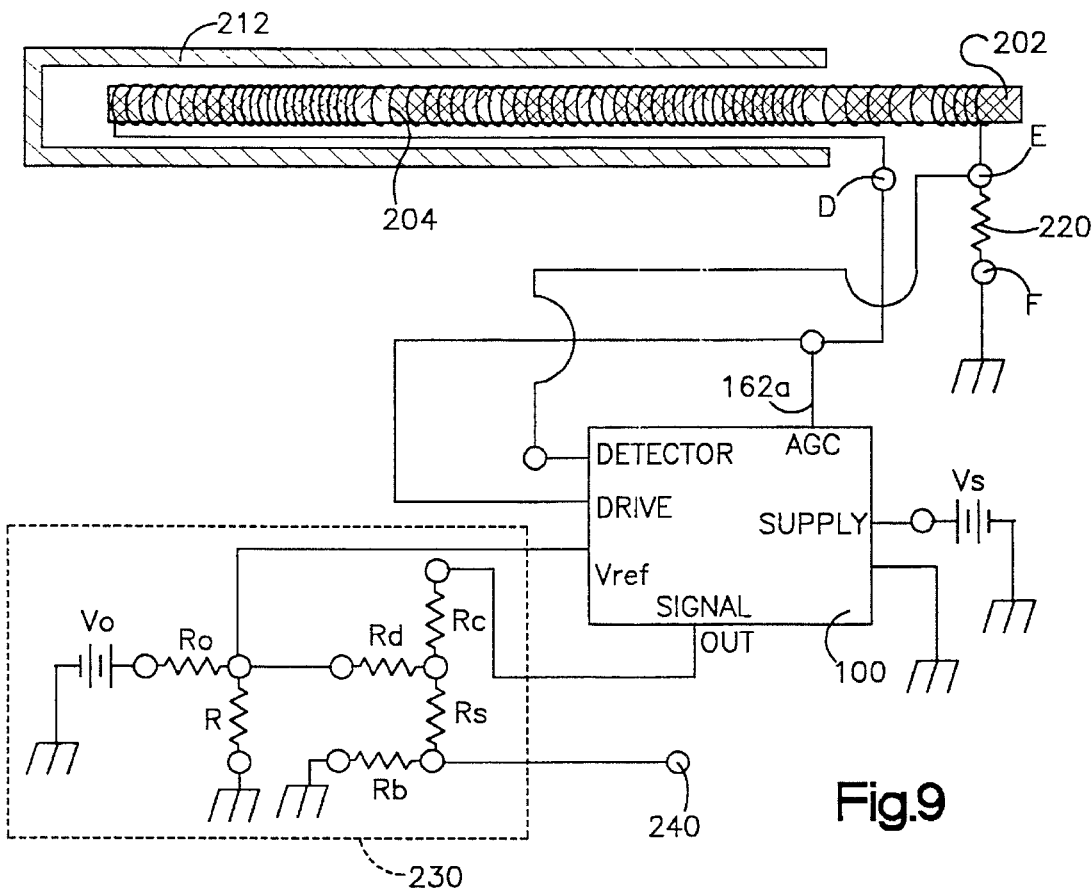
FIG. 9 is a schematic depiction of the integrated circuit of FIG. 8 coupled to the single coil position sensor of FIG. 7B having a positive feedback circuit for controlling a range of position sensor response.

An embodiment of the invention that uses positive feedback to enhance the dynamic response of the circuit 100 is shown in FIG. 9. A coil 204 with leads E,D is wound on a magnetically permeable core 202. A series resistor 220 with resistance Rde is used to monitor the signal as in the embodiment shown in FIG. 7B. The integrated circuit 100 provides a sinusoidal excitation signal to the coil at lead D and measures the voltage amplitude appearing across the resistor 220 via connection to the "Detector" input 160 of the circuit. As described above, the circuit varies its "Drive" output from the amplifier 156 to maintain a sinusoidal voltage amplitude at the "AGC" input 162*a* that is a constant proportion of the DC voltage applied to the "Vref" input of the circuit.

In the embodiment of FIG. 9, the "AGC" input is directly monitoring the "Drive" output of the circuit which is applied across the series connection of the coil and the resistor, i.e. between two taps D,F. The "Signal Out" output of the circuit in turn is a DC voltage that is a constant proportion of the sinusoidal voltage amplitude seen at the "Detector" input of the circuit. In this case, the sinusoidal voltage seen at the "Detector" input is the voltage seen between points "E" and "F", i.e. the sinusoidal voltage across the resistor 220.

As can be seen in FIG. 9, a bias network 230 consisting of multiple resistor elements is used to make a weighted sum of a reference voltage Vo with the "Signal Out" output of the circuit 100. In the bias network, resistors Ro and Rd are used to adjust the relative weights of reference voltage Vo and the "Signal Out" output of the driver/detector circuit 100. Resistors Rc, Rs and Rb are used to divide the final output 240 down from that of the "Signal Out" output 207 of the circuit. For the following resistor ratios:

Rd=R/150, Ro=R/25, Rc=R/500, Rs=50*R and Rb=100*R, the DC voltage input to the "Vref" input of the circuit is:

Vref=0.816094 "Signal Out"+0.176822 Vo.

The output is:

Output=0.638367 "Signal Out"+0.0272031 Vo.

The bias network 230 makes a weighted sum of the Vo reference voltage and the "Signal Out" output voltage and brings it into the "Vref" input of circuit. This in turn is the voltage to which the voltage seen at the "AGC" input of circuit is controlled through variation of the "Drive" output. When the conductive tube 212 is moved on or off a coil, it will vary the inductance of the coil in the manner described in the preceding embodiments. A decrease in the inductive reactance of coil will in turn increase the signal seen at the lead "E" which will in turn increase the output 207 from "Signal Out". The "Signal Out" output increase will in turn raise the voltage seen at the "Vref" input of the circuit. This will increase the "Drive" output which will further increase the "Signal Out" output of the circuit.

This is a positive feedback arrangement. For appropriate choices of proportion between the "AGC" and "Vref" inputs, between the "Signal Out" output & "AGC" input and between the resistor values in the bias network, the positive feedback arrangement will result in a substantially larger dynamic range at the "Signal Out" output 207 than would be seen without the positive feedback.

Consider the following choices of proportion in a positive feed back arrangement:

The resistance Rde of the series resistor 220 at point "E" is ⅓rd the magnitude of the impedance of the coil when the conductive tube does not overlap any portion of the coil and the inductive impedance of the coil 204 drops by 70% when it is completely overlapped by the conductive tube. The sinusoidal voltage amplitude seen at the "AGC" input 162*a* is kept equal to the DC voltage seen at the "Vref" input, the DC voltage produced at the "Signal Out" output is twice the amplitude of the sinusoidal voltage seen at the "Detector" input, and the bias network resistor proportions are:

Rd=R/150, Ro=R/25, Rc=R/500, Rs=50*R and Rb=100*R.

The voltage seen at the output when the conductive tube is completely removed from the coil is 0.87 Vo. The voltage seen at the output when conductive tube completely covers the coil is 0.12 Vo. This gives a dynamic range of variation from minimum to maximum output of 725%. With other choices of proportion in the circuit and the bias network resistances, even larger dynamic ranges can be achieved for the same 70% change of impedance in the coil.

Setting the resistance Rd of the bias network resistor network 230 to a large value, i.e., 150*R, eliminates the positive feedback from the "Signal Out" output of the circuit. Lowering the resistance Ro of the bias network resistor element to a small value, i.e., R/150, sets the voltage seen at the "Vref" input approximately equal to Vo, the value of the reference voltage. With these two changes, the voltage seen at the output when the conductive tube is completely removed from the coil is 0.70 Vo. The voltage seen at the output when the conductive tube completely covers the coil is 0.33 Vo. This gives a dynamic range of variation from minimum to maximum output of only 212%.

Figure 10:
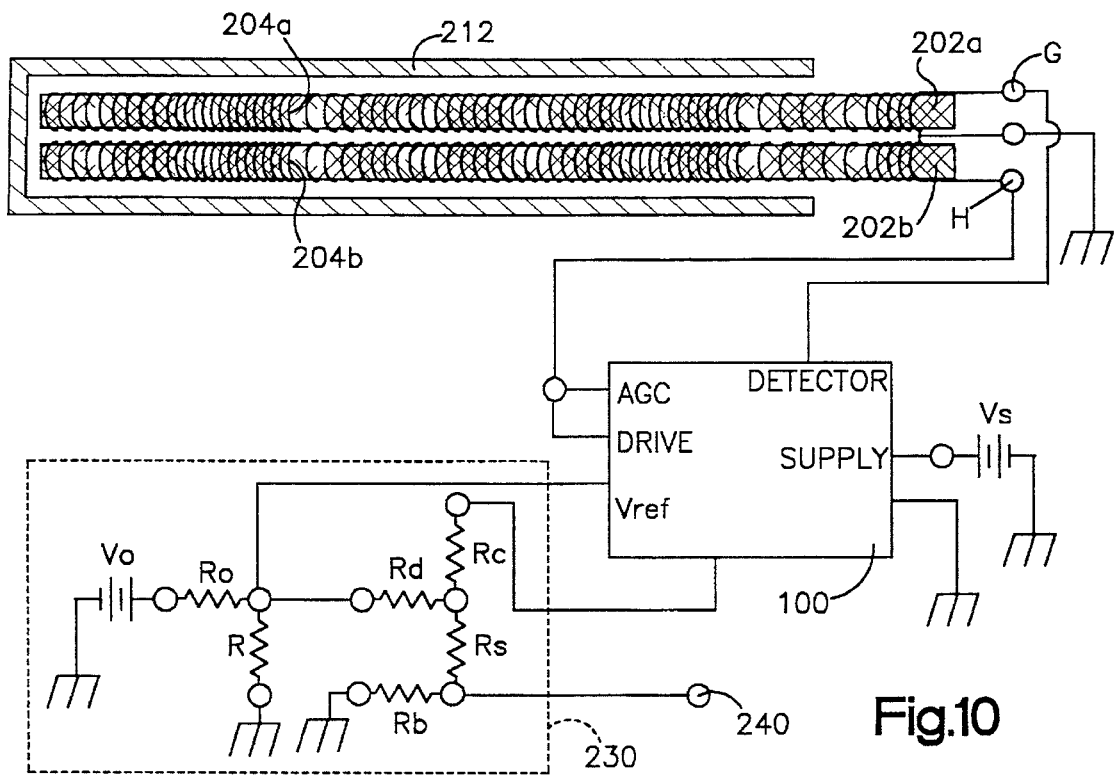
FIG. 10 is a schematic depiction of the integrated circuit of FIG. 6 coupled to the two coil position sensor of FIG. 3 having a positive feedback circuit for controlling a range of position sensor response.

Referring to FIG. 10, there are two coils 204*a*, 204*b* wound on magnetically permeable cores 202*a*, 202*b*. A grounded lead is common to both coils. The coils 204*a*, 204*b* also have leads G,H respectively. A driver/detector circuit 100 such as that described in the earlier embodiments is used to drive both coils with the circuit's "Drive" output applied to the leads G,H. Lead G of the coil 204*a* is also electrically connected to the "AGC" input of the circuit 100. The coil 204*b* in turn is connected to the "Detector" input of the circuit at lead H. An electrically conductive tube 212 is positioned to slide over both coils.

As in the FIG. 9 embodiment, a bias network 230 is provided to scale the output and provide positive feedback to the circuit. When driver/detector circuit 100 excites the coil 204*b* with a sinusoidal current, a sinusoidal varying flux is induced in the core 202*b*. This flux will in turn magnetically link any portion of the electrically conductive tube 212 that overlies the coils. This linkage in turn produces sinusoidally varying eddy currents in tube that will in turn induce a sinusoidally varying flux in both cores 202*a*,202*b*. According to Maxwell's well know laws the flux induced in core 202*b* by tube will be 180 degrees out of phase to that produced by coil 204*b* and will appear as decreased inductive reactance in coil 204*b*. The flux produced in coil 204*a* by the eddy currents in tube 212 appears as an emf at the lead G whose amplitude is measured at the "Detector" input of driver/detector circuit.

As described in the previous embodiments, the driver/detector circuit will vary the amplitude of the sinusoidal voltage produced at the "Drive" output to maintain a sinusoidal voltage amplitude at the "AGC" input that is a constant proportion of the DC voltage at the "Vref" input. In this embodiment, the "AGC" input and "Drive" output are connected in common which will result in the amplitude of the sinusoidal voltage across coil 202*b* being a constant proportion of the DC voltage at the "Vref" input. The "Signal Out" output in turns produces a DC voltage that is a constant proportion of amplitude of the sinusoidal voltage at the "Detector" input.

The bias network 230 in turn performs a weighted sum of the voltage from the "Signal Out" and the external reference voltage Vo. As described in the previous embodiment, this produces a positive feedback effect as any increase in the "Signal Out" output raises the voltage at the "Vref" input which in turn raises the amplitude of the sinusoidal voltage at the "Drive" output which increases the current in the coil 204b. Increased current in coil in turn increases the eddy currents in tube which gives an increased amplitude in the corresponding emf that is produced in coil 204b. This in turn further increases the voltage at the "Signal Out" output. As in the previous embodiment, choices of the proportions between the "AGC" & "Vref" inputs, the "Detector" input & "Signal Out" output and between the various resistances in the bias circuit, effect the degree of feedback. As in the previous embodiment, use of positive feedback serves to increase the ratio between the highest and lowest voltages produced at the "Signal Out" output 207 as electrically conductive tube 212 is slid onto or off of the coils 204a, 204b.

Figure 11:
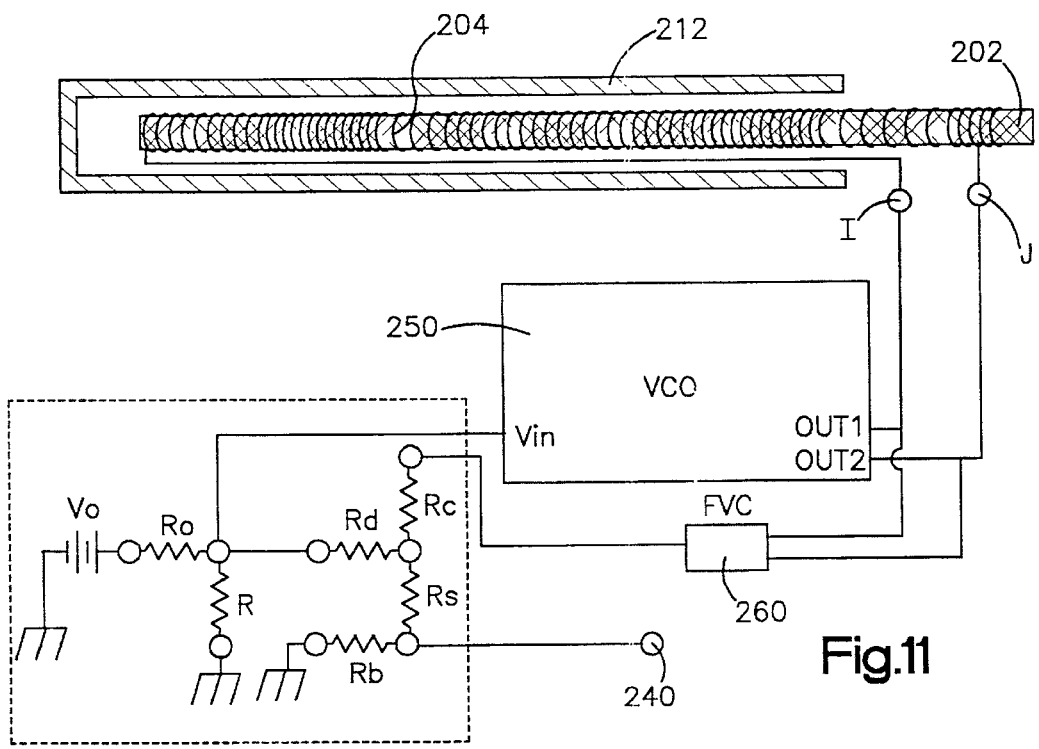
FIG. 11 is a schematic depiction of a single coil position sensor having an alternate sensing circuit using positive feedback range control.

Referring to FIG. 11, a coil 204 is wound on a magnetically permeable core 202. The leads I,J of the coil are connected to the output of a Voltage Controlled LR Oscillator 250 in such a manner that the inductance of the coil provides all or part of the inductance "L" of the "LR" oscillator. The leads I,J of the coil 204 are also electrically connected to the input of a FVC 260 (frequency to voltage converter). The voltage output of the FVC is in turn electrically connected to a biasing network 230. The resistance values and reference voltage (Vo) are selected to achieve a desired weighted sum between Vo and the output of the FVC. As in the previous embodiments, the biasing network also divides down the output voltage of the FVC to a desired level which appears at the "Output" terminal 240 as shown.

Figure 12:
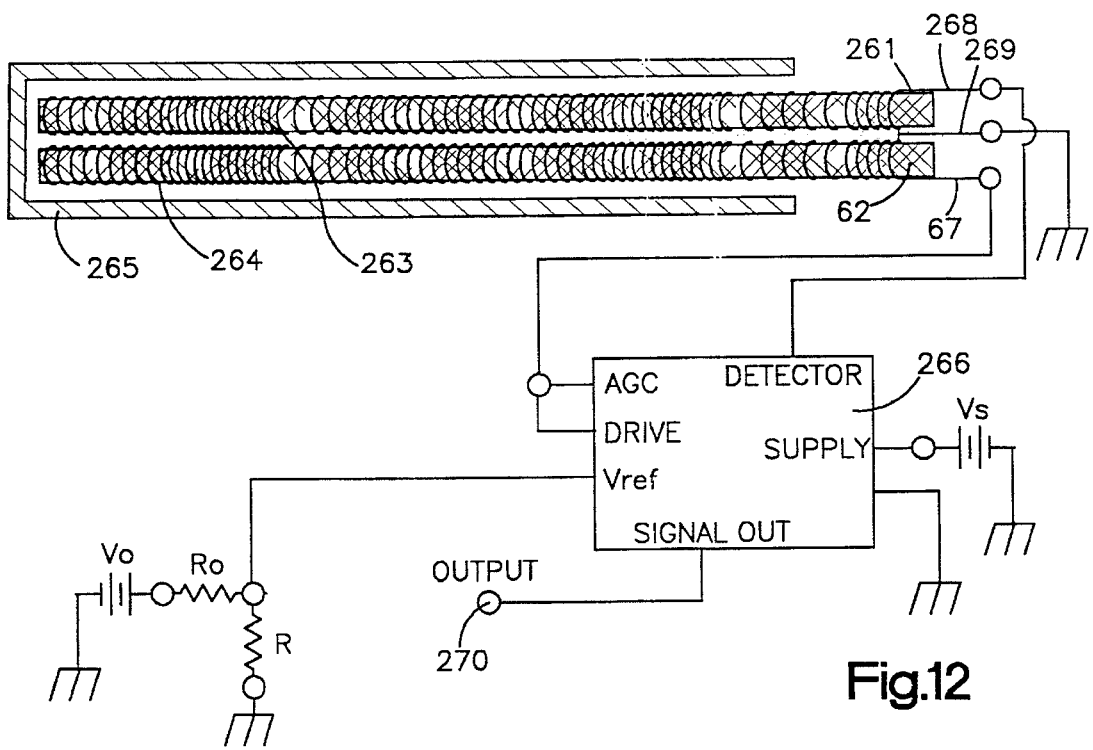
FIG. 12 is a schematic showing a phase sensitive circuit for detecting relative movement of two members.

Referring to FIG. 12, two cores 261, 262 are shown wound with coils 263, 264 respectively. The cores 261,262 are arranged in a side by side arrangement. For designs with cores of about 0.05 inch diameter of low carbon steel such as AISI 1010, and aluminum tube 265 and using a drive frequency of 12.8 kilohertz, behavior is as observed in the earlier embodiments described previously.

Figure 13A:
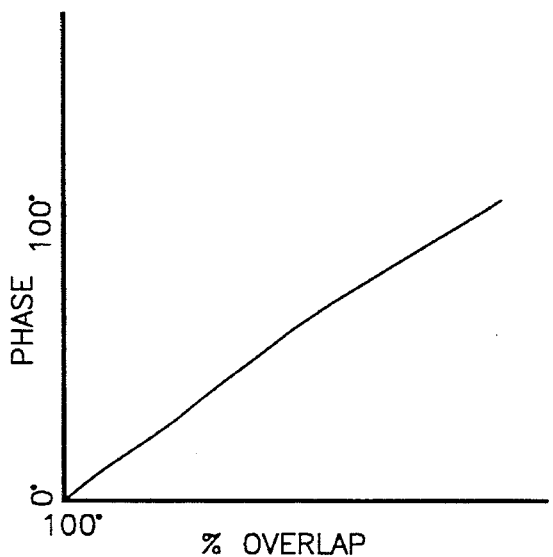
FIGS. 13A and 13B are graphs showing sensed parameters as a function of overlap between a coupling member and a spirally wound coil.

With a high drive frequency such as 164 kilohertz applied to the leads 267,269 across the primary, however, the response of the sensor is different. As the aluminum tube 265 progressively overlaps the two wound cores 261,262, the phase of the induced signal observed on the secondary coil leads 268,269 shifts by as much as 100 degrss between complete overlap and no overlap of the tube 265. FIG. 13A shows a representation of this variation in phase with respect to the tube overlap of the wound cores 261,262. The variation is monotonic, but can be controlled by variation of the turn density versus position profile along the coils 263,264. In most applications it would be preferable to have a linear phase versus overlap relationship.

When operating in this phase variation mode, a circuit 266 is configured to provide a constant voltage amplitude drive of approximately 164 Kilohertz and a detector that responds to the phase shift between the drive and induced signals. The circuit 266 would convert a measured phase difference into a direct current voltage level at an output 270. Such a device would work particularly well in a control system that uses phase as an input. In such a system, the detector portion of the circuit 266 could be omitted and the control system would respond directly to the phase of the induced signal as it varies with the relative position of the tube 265.

Figure 13B:
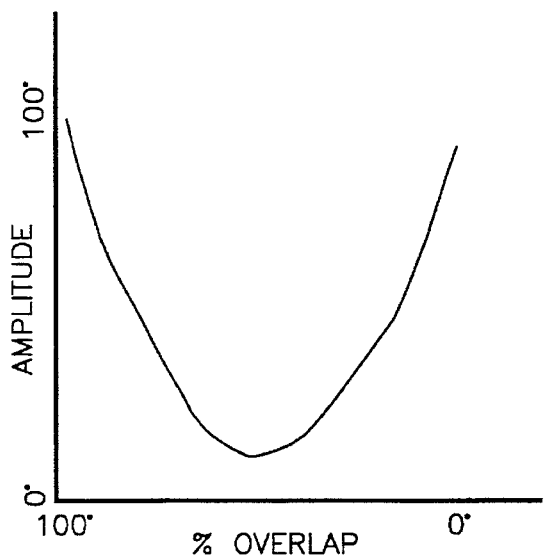

In a further variation, the amplitude of the induced signal can be monitored. As shown in FIG. 13B, the amplitude tends to monotonically decrease between full and medium overlap and then monotonically increase between medium and no overlap. As in the phase mode, the shape and minimum point of this profile can be modified by varying the turn density along the coils 262,263.

A linear position sensor assembly according to the invention may be made responsive over 90 percent of the stroke length of the tracking portion with respect to the base portion. Thus, space occupied by the assembly is substantially reduced. In addition to positioning within a shock absorber, the invention may be adapted to mounting external to a shock absorber parallel to the direction of its travel. The invention may additionally find application in sensing the position of portions of an automotive vehicle other than the suspension system and may be applied to non-vehicular uses such as use with machine tools and the like.

Other changes and modifications in the specifically described embodiments can be carried out without departing from the principles of the invention which is intended to be limited only by the spirit or scope of the appended claims.

We claim:

1. Sensing apparatus for monitoring movement between two relatively moveable members comprising:
   a) an electronic sensor positioned in proximity to the two relatively moveable members having a radially-wound electrically conductive coil having a signal input terminal for receiving a time varying signal input and an output terminal for providing a signal output based on relative movement of the two relatively moveable members; and
   b) a control circuit electrically coupled to the electronic sensor including:
      i) energization circuitry for coupling a time varying signal to the signal input terminal of the electronic sensor;
      ii) monitoring circuitry for monitoring a return signal from the output terminal of the electronic sensor as the time varying signal is applied to the sensor to provide an output signal related to the relative positions of the moveable members; and
      iii) positive feedback control circuitry for adjusting the time varying signal coupled to the sensor based on the monitored signal from the monitoring circuitry to enchance a dynamic range of the output signal from the monitoring circuitry.

2. The sensing apparatus of claim 1 wherein the monitoring circuitry monitors a phase of the return signal from the sensor and the output signal is based on the phase of the return signal.

3. The sensing apparatus of claim 1 wherein the electronic sensor circuit comprises a probe having a coil wound about a probe core and further wherein the monitoring circuit comprises an oscillator circuit that includes the coil and wherein the monitoring circuit comprises a frequency to voltage converter for providing an output signal related to the movement of the relatively moveable members.

4. Sensing apparatus for monitoring a degree of relative movement between two relatively moveable members comprising:
   a) an elongated probe moveable with a first of the two relatively moveable members having a radially-wound electrically conductive coil encircling a supporting core along a length of said core;
   b) a conductive coupling member moveable with a second of the two moveable members overlapping at least a portion of the elongated probe and translatable along the length of the core as a relative separation between the two relatively moveable members changes to alter a signal in the conductive coil; and c) a control circuit electrically coupled to the conductive coil of the elongated probe including:
 i) energization circuitry for coupling a time varying signal to the coil;
 ii) monitoring circuitry for monitoring changes in a signal from the conductive coil as the time varying signal is applied to the conductive coil based on a relative movement of the probe and coupling member and for providing an output signal related to the relative positions of the moveable members; and
 iii) feedback control circuitry for adjusting the time varying signal coupled to the coil to a control level based on the monitored signal from the monitoring circuitry to enhance a dynamic range of the output signal from the monitoring circuitry.

5. The sensing apparatus of claim 4 wherein the energization circuitry comprises an automatic gain control circuit, for controlling the time varying signal applied to the coil by comparing a return signal from the coil with a reference signal that is adjusted by the feedback control circuitry.

6. The sensing apparatus of claim 5 additionally comprising a signal source for providing the reference signal and wherein the feedback control circuitry comprises a resistance network coupled between the signal source and the energization circuitry.

7. Sensing apparatus for monitoring a degree of relative movement between two relatively moveable members comprising:
 a) an elongated probe attached to and moveable with a first of the two relatively moveable members including a single radially-wound electrically conductive coil encircling a core that has electrical taps at two ends of the single coil and that further includes at least one intermediate tap positioned intermediate the electrical taps at the two ends of the single coil for monitoring electric signals along a length of the coil;
 b) a coupling member attached to and moveable with a second of the two moveable members to overlie a varying length of the single coil of the elongated probe; and
 c) a control module electrically coupled to the single radially-wound conductive coil that comprises:
  i) an exciter circuit for generating a time varying signal and applying the time varying signal across the single coil; and
  ii) a monitor circuit electrically coupled to the intermediate tar of the single coil for monitoring induced current in the single coil at the intermediate tap and providing a control output signal that correlates changes in the induced current with a relative position between the two relatively moveable members, the induced current in the single coil changing with the length of the single coil overlied by the coupling member.

8. A method for monitoring a degree of relative movement between two relatively moveable members comprising the steps of:
 a) attaching an elongated probe having a radially-wound electrically conductive coil encircling a supporting core along a length of said core to one of the two relatively moveable members;
 b) attaching a conductive coupling member to a second of the two relatively moveable members in overlapping relation with at least a portion of the elongated probe; and
 c) monitoring relative separation between two relatively moveable members coupled to the probe and the coupling member by performing the substeps of:
  i) energizing the conductive coil of the elongated probe with a time varying signal;
  ii) monitoring a signal from the coil as the time varying signal is applied to the coil that changes with a degree of overlap between the coupling member and the elongated probe and providing an output signal related to the relative positions of the moveable members; and
  iii) adjusting the time varying signal coupled to the coil to a control level based on the monitored signal from the monitoring circuitry to enchance a dynamic range of the output signal from the monitoring circuitry.

9. The method of claim 8 wherein the substep of adjusting the time varying signal is performed by comparing a reference signal with the time varying signal coupled to the coil and wherein the reference signal is adjusted based on the monitored signal from the monitoring circuitry.

10. Sensing apparatus for monitoring movement between two relatively moveable members comprising:
 a) an electronic sensor including a single radially-wound conductive coil mounted to one of two relatively moveable members having an input for receiving an alternating current signal input and an output for providing a signal output based on relative movement of the two relatively moveable members; and
 b) a control circuit electrically coupled to the sensor including:
  i) energization circuitry for coupling a high frequency alternating current signal to the input of the sensor;
  ii) monitoring circuitry for monitoring phase variations of an alternating current return signal from the sensor as the phase of said alternating current return signal changes with a relative position of the moveable members and producing an output signal related to the relative position; and
  iii) feedback control circuitry for adjusting the alternating current signal coupled to the coil to a control level based on the monitored signal from the monitoring circuitry to enchance a dynamic range of the output signal from the monitoring circuitry.

11. Sensing apparatus for monitoring a degree of relative movement between two relatively moveable members comprising:
 a) an elongated probe attached to and moveable with a first of the two relatively moveable members including a single radially-wound electrically conductive coil encircling a core that has electrical taps at two ends of the single coil and that further includes at least one intermediate tap for monitoring electric signals along a length of the coil;
 b) a coupling member attached to and moveable with a second of the two moveable members overlapping the elongated probe for altering a time varying signal applied to the single coil; and
 c) a control module electrically coupled to the radially-wound conductive coil that comprises:
  i) an exciter circuit for generating a time varying signal and applying the time varying signal across the single coil; and ii) a monitor circuit for monitoring induced current in the single coil at the intermediate tap and providing a control output signal that correlates changes in the induced current with a relative position between the two relatively moveable members; and d) a feedback circuit coupled to the exiter circuit and the monitor circuit to adjust an output from the exciter circuit to the coil based on a return signal from the coil to enhance a dynamic range in the control output signal.

12. The sensing apparatus of claim 11 additionally comprising a voltage source for providing a reference signal coupled to the exciter circuit for use in generating the time varying signal applied to the single coil and wherein the feedback circuit adjusts the magnitude of the reference signal based on the control output signal from the monitor circuit.

* * * * *